(12) United States Patent
Keiserman

(10) Patent No.: US 11,192,418 B2
(45) Date of Patent: Dec. 7, 2021

(54) VEHICLE SUSPENSION ARRANGEMENT

(71) Applicant: SAF-HOLLAND, Inc., Muskegon, MI (US)

(72) Inventor: Jaurez Keiserman, Porto Alegre (BR)

(73) Assignee: SAF-HOLLAND, Inc., Muskegon, MI (US)

( * ) Notice: Subject to any disclaimer, the term of this patent is extended or adjusted under 35 U.S.C. 154(b) by 132 days.

(21) Appl. No.: 16/342,599

(22) PCT Filed: Oct. 18, 2017

(86) PCT No.: PCT/IB2017/056485
§ 371 (c)(1),
(2) Date: Apr. 17, 2019

(87) PCT Pub. No.: WO2018/073771
PCT Pub. Date: Apr. 26, 2018

(65) Prior Publication Data
US 2019/0255900 A1 Aug. 22, 2019

(30) Foreign Application Priority Data
Oct. 18, 2016 (BR) ...................... 10 2016 024276 2

(51) Int. Cl.
*B60G 11/24* (2006.01)
*B60G 9/02* (2006.01)
(Continued)

(52) U.S. Cl.
CPC ............. *B60G 11/24* (2013.01); *B60G 9/02* (2013.01); *B60G 11/28* (2013.01); *B62D 61/12* (2013.01);
(Continued)

(58) Field of Classification Search
CPC .......... B60G 11/24; B60G 11/28; B60G 9/02; B60G 2200/315; B60G 2202/1524;
(Continued)

(56) References Cited

U.S. PATENT DOCUMENTS 2,887,310 A    5/1959  Muller
2,970,848 A *  2/1961  Rice .................... B60G 5/04
                                                   280/683
(Continued)

FOREIGN PATENT DOCUMENTS

DE    199 20 670 A1    11/2000
DE    103 33 757 A1    2/2005
(Continued)

OTHER PUBLICATIONS

United States Patent Office; International Search Report, dated Jan. 25, 2018.
(Continued)

*Primary Examiner* — Frank B Vanaman
(74) *Attorney, Agent, or Firm* — Price Heneveld LLP

(57) ABSTRACT

A vehicle suspension includes at least one anchor bar, at least one axle lift spring, an auxiliary drop-type axle which may be selectively lifted or lowered and a single, integrated support attaching the at least one axle lift spring and the at least one anchor bar to the auxiliary drop-type axle, wherein the single, integrated support provides the only attachment of the at least one axle lift spring and the at least one anchor bar to the auxiliary drop-type axle, and wherein the support includes an open area configured to allow the passage of a cardan.

7 Claims, 3 Drawing Sheets

(51) Int. Cl.
*B60G 11/28* (2006.01)
*B62D 61/12* (2006.01)
*B60G 17/005* (2006.01)
*B62D 21/02* (2006.01)

(52) U.S. Cl.
CPC ...... *B60G 17/005* (2013.01); *B60G 2200/315* (2013.01); *B60G 2202/1524* (2013.01); *B60G 2202/412* (2013.01); *B60G 2300/40* (2013.01); *B62D 21/02* (2013.01)

(58) Field of Classification Search
CPC ........ B60G 2202/412; B60G 2300/402; B62D 61/12; B60B 35/007; B60B 35/008
See application file for complete search history.

(56) References Cited

U.S. PATENT DOCUMENTS

| | | | |
|---|---|---|---|
| 3,877,718 A | 4/1975 | Scanlon et al. | |
| 4,293,145 A | 10/1981 | Taylor | |
| 4,664,407 A * | 5/1987 | Griffin, Sr. | B60G 9/003 |
| | | | 267/256 |
| 6,123,949 A * | 9/2000 | Cochran | C07K 14/005 |
| | | | 424/232.1 |
| 6,267,397 B1 * | 7/2001 | Hamada | B60G 9/02 |
| | | | 280/124.128 |
| 2006/0261570 A1 * | 11/2006 | Eshelman | B60G 11/16 |
| | | | 280/124.134 |
| 2009/0206570 A1 | 8/2009 | Strong | |

FOREIGN PATENT DOCUMENTS

| | | | |
|---|---|---|---|
| DE | 103 33 760 A1 | 2/2005 | |
| EP | 0 991 560 A1 | 4/2000 | |
| EP | 2 500 184 A1 * | 9/2012 | ............... B60G 9/00 |
| JP | H10 324127 A | 12/1998 | |
| WO | 2004108508 A1 | 12/2004 | |

OTHER PUBLICATIONS

The Hague, Supplemental European Search Report; dated Nov. 20, 2019.

* cited by examiner

VEHICLE SUSPENSION ARRANGEMENT

BACKGROUND OF THE INVENTION

The current invention refers to a support device for use in an auxiliary axle set-up in vehicles and, more specifically, to a support device for use in an auxiliary drop-type axle set-up which includes an integrated system for attachment of the anchor bars and the axle's lift spring.

The technical sector is familiar with the use of air suspensions with auxiliary axles which allow the weight of the load transported by a vehicle to be shifted at different points of contact with the road. Those axles are widely used in vehicles that carry heavy loads, such as trucks and similar vehicles.

Also known are the auxiliary axles which may be selectively lowered and lifted according to load transport need. For that kind of solution, the auxiliary axle is used in a lowered position when the need for shifting the load over more than one axle arises and in a lifted position when the vehicle is driven with a small load or no load.

The possibility of lifting the auxiliary axle when there is no need to use it makes tire wear reduction possible and increases fuel consumption efficiency.

In order for the auxiliary axle to be adequately lifted and lowered, the auxiliary axle set-up usually comes with an axle suspension system which works by means of the pressure exercised by an air spring when pressurized, here referred to as a lift spring.

Many of the known suspension systems also make use of suspension bars or anchor bars. Those anchor bars have the function of establishing the geometry and controlling axle movement when the suspension is in operation.

Several types of construction for axle suspension systems are known in the technical sector but the use of air springs is amongst the most efficient. The use of air springs—that is, pressurized rubber springs—makes the production of safer, lighter, more comfortable, and economical road vehicles possible. The present system applies above all to axles with pneumatic suspension.

Thus, the auxiliary axles known in the technical sector usually include supports for attachment of anchor bars and supports specifically designed to house and attach the air spring which lifts the axle.

The need to include different supports results in the extremely complex construction of those known axles. Additionally, attaching different supports to the axle creates distinct attachment points—many of which require welding—increasing the concentration of pressure on the axle and impacting durability.

Auxiliary axles positioned between the vehicle's traction axle and its motorization are frequently used. Due to their position, these axles allow passage of the cardan, and for that reason, have a curvature in the central part, usually downward. Because they have this downward curvature, they are usually called drop axles.

The existence of the cardan, combined with this curvature in the axle, makes it extremely difficult to obtain a geometric solution that will make it possible for the support to sufficiently withstand the pressure coming from the axle anchor bars and that resultant from the lift spring.

Since the support designed to attach the axle anchor bars and the lift spring cannot be attached to the axle's central region, due to cardan passage, this support will occupy larger areas of the axle for attachment and for that reason tends to behave like a structural part of the axle, helping to support a large part of the vertical loads to which the axle is subjected. This condition is aggravated by reduced inflexibility to bending caused by the drop axle geometric shape, whose deformation under the load is transmitted to the support. These characteristics make it necessary to have an extremely strong construction for the support, which is heavy and costly, or with the present invention's innovative concept, have a very thin format capable of elastic deformation when the axle is subjected to vertical pressures characteristic of its use and in this way not transferring this pressure to the support for the anchor bar and air spring which lifts the axle.

SUMMARY OF THE INVENTION

Thus, it is one of this invention's objectives to provide a drop-type auxiliary axle set-up and an integrated support system for the anchor bars and for the air spring which allows lifting, as the connection between the axle and the support's upper part where the anchor bars and lift spring are attached is accomplished by extremely low rigidity to vertical flexing, in such a manner that it may deform elastically, absorbing the axle deformations in its usual operation without the support sustaining a significant part of these pressures, and allowing construction which is light and economical. This geometry of low rigidity is obtained, in accordance with the present invention, by means of thin plates in an inverted "V" format. The present invention may also be configured utilizing two or more thin plates making up each side of the "V", whose angle may also present variations, while not altering this invention's innovative concept.

Another one of the present invention's objectives is to provide an auxiliary axle set-up where the anchor bar support and the air spring support of the lift axle spring are integrated, simplifying the set-up structure and decreasing the concentration of pressure on the axle.

Another one of the present invention's objectives is to provide an auxiliary axle set-up in which the anchor bar support and the lift axle spring support possess a geometry that allows the passage of the cardan which drives the vehicle's traction axle.

It is another one of this invention's objectives to provide a support device for anchor bars and the air lift spring which may be adapted to several types and sizes of drop axles.

It is yet another objective of the present invention to provide a support device for anchor bars and air spring which may be used with several types and sizes of anchor bars.

The present invention accomplishes the above objectives by means of a support device for attachment of at least one anchor bar and at least one lift axle spring in an auxiliary axle of a vehicle axle set-up which may be selectively lifted and lowered, where attachment of the lift axle spring and the attachment of at least one end of one anchor bar are effected by means of only one integrated support.

Preferentially, this invention's support device includes an integrated support with an axle insert part, one first attachment part for attaching the axle lift spring and a second part for attaching one end of at least one anchor bar, with the connection between the axle insert part and the parts for attaching the lift spring and the anchor being made by means of thin plates in inverted "V" shape.

These thin plates in inverted "V" shape, due to their low degree of rigidity to vertical flexion, become elastically deformed when the axle receives vertical loads and, in this manner, the support set-up avoids having a significant role in the axle's structural resistance to vertical loads.

In the execution of the present invention the plates in inverted "V" geometric shape and the various parts that serve as support to the anchor bars and/or the axle lift springs may be attached in between by welding or bolted-in or revited, but with no change to the character of the present invention.

In the execution of the present invention, the number of thin plates making up each "V" side or the angle between these various plates may be altered with no change to this invention's innovative concept.

In the preferred execution of this invention, the axle insert portion includes at least one curved surface to fit in the axle, the first attachment part includes a flat wall where one end of the lift spring is attached and the second attachment part includes the means to receive an accessory to attach the end by at least one anchor bar.

Additionally, in the preferred set-up, this invention's support device also includes a secondary support to connect the axle lift spring to a part of the vehicle's chassis.

The secondary support includes a flat wall that receives the other end of the lift spring and at least one connecting arm to connect the flat wall to a portion of the vehicle's chassis. In the preferred execution of the device in the present invention, the secondary support includes two connecting arms to connect the flat wall to a portion of the vehicle's chassis.

The present invention also considers a drop-type auxiliary axle set-up including the integrated support proposed by the present invention.

DETAILED DESCRIPTION OF THE PREFERRED EMBODIMENTS

Next, the present invention will be described in more detail based on the examples executed and illustrated in the designs.

Figure 1:
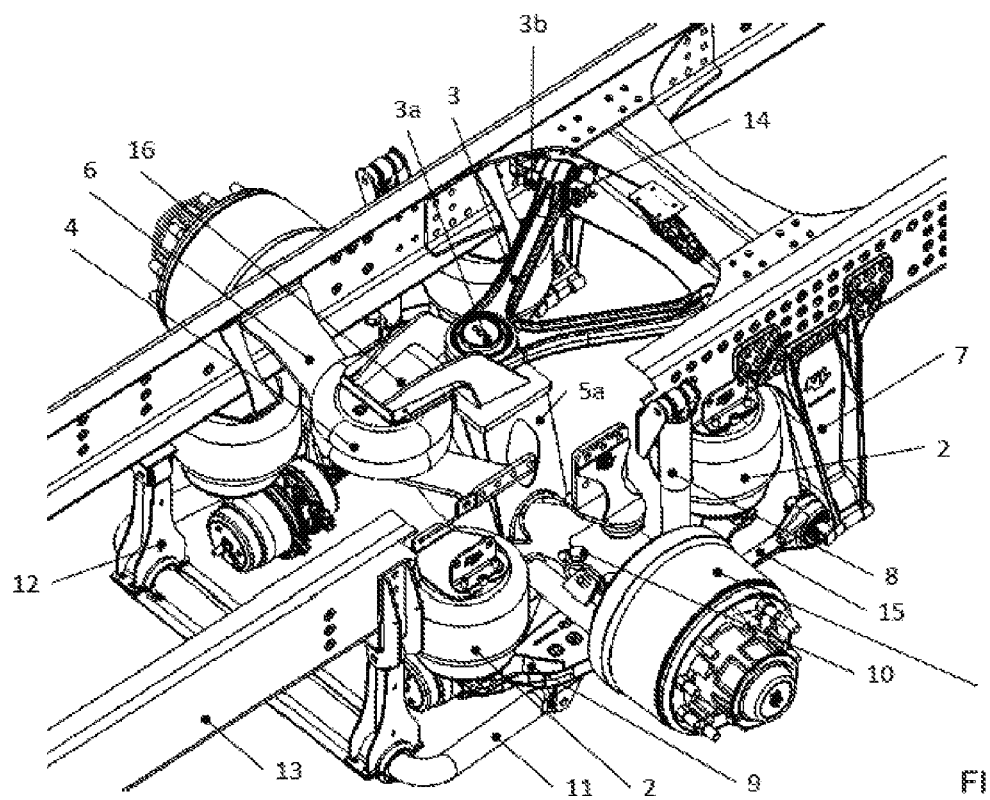
FIG. 1 shows a view in perspective of the vehicle air suspension with one auxiliary drop-type axle set-up in accordance with the preferred implementation of the present invention.

FIG. 1 shows a vehicle air suspension including a drop-type auxiliary axle set-up, according to a preferred execution of the present invention. The suspension is shown installed in a chassis 13 of a vehicle (only the part representing the chassis part illustrated). Even though FIG. 1 shows the suspension installed directly on the vehicle's chassis, a technically knowledgeable person will understand that the suspension could be installed through an intermediate support or similar structure.

The suspension includes a drop-type auxiliary axle set-up 1 whose body is supported by beams 9, to which the axle is attached by means of bolts 10. The ends of the beams 9 receive the air suspension springs 2 which connect to the chassis 13. Shock absorbers 8 may be connected between the beams 9 and the chassis 13, and suspension supports 7 may be provided to connect the beams 9 of the suspension to the chassis 13 of the vehicle. The suspension may also include a stabilizer bar 11 attached by shackles 12 to the chassis 13 of the vehicle and one or more lower anchor bars 15 to anchor the axle 1 of the chassis of the vehicle.

The upper anchor bars 3 are attached preferentially to a support 14 which is attached to the chassis 13.

The upper anchor bars 3 may include structures with a variety of shapes and dimensions but usually include rubber bushings 3a and 3b on each end of the bar.

It should be pointed out that even though only one beam 9, bolts 10, shock absorber 8, lower bars 15, support 7, and shackle 12 are numbered in FIG. 1, those parts are on both sides of the suspension.

With the exception of the new support here proposed, the operation of the suspension components referred to above is known by those familiar with the technique and, for that reason, are not described here in detail.

As is well known by those technically knowledgeable, an auxiliary axle set-up which may be lifted and lowered includes an axle suspension system.

Thus, in the execution of the invention shown in FIG. 1, the lift axle system includes an air lift spring 4, which makes it possible to lift or to lower the drop axle 1, with axle 1 connected through support 16 to the chassis 13 by means of support 6.

The present invention includes an integrated support device 16 allowing attachment of the lift spring 4 as well as one or more anchor bars 3 to the auxiliary drop-type axle 1.

With the integrated device 16 which supports the lift spring 4 as well as one or more anchor bars 3, the present invention provides a compact solution, with thin plates 5a and 5b in "V" which make up the support 16 allowing cardan passage and providing a connection between the drop axle and the parts where bar 3 is anchored and the lift spring 4 as well.

Figure 2:
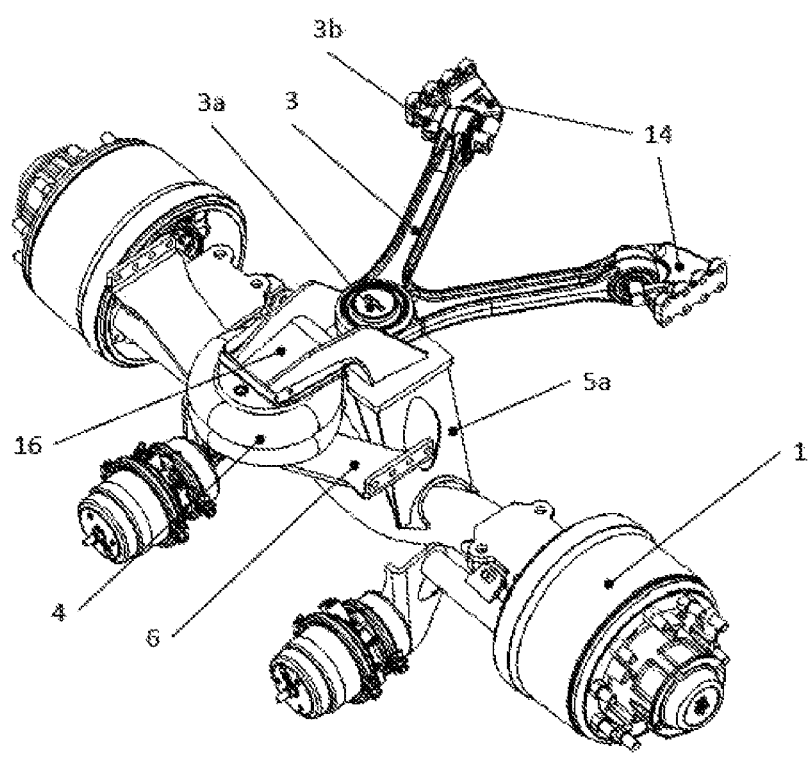
FIG. 2 shows a view in perspective of the drop-type auxiliary axle including a support device in accordance with a first implementation of the present invention, with the support shown connected to anchor bars.
Figure 3:
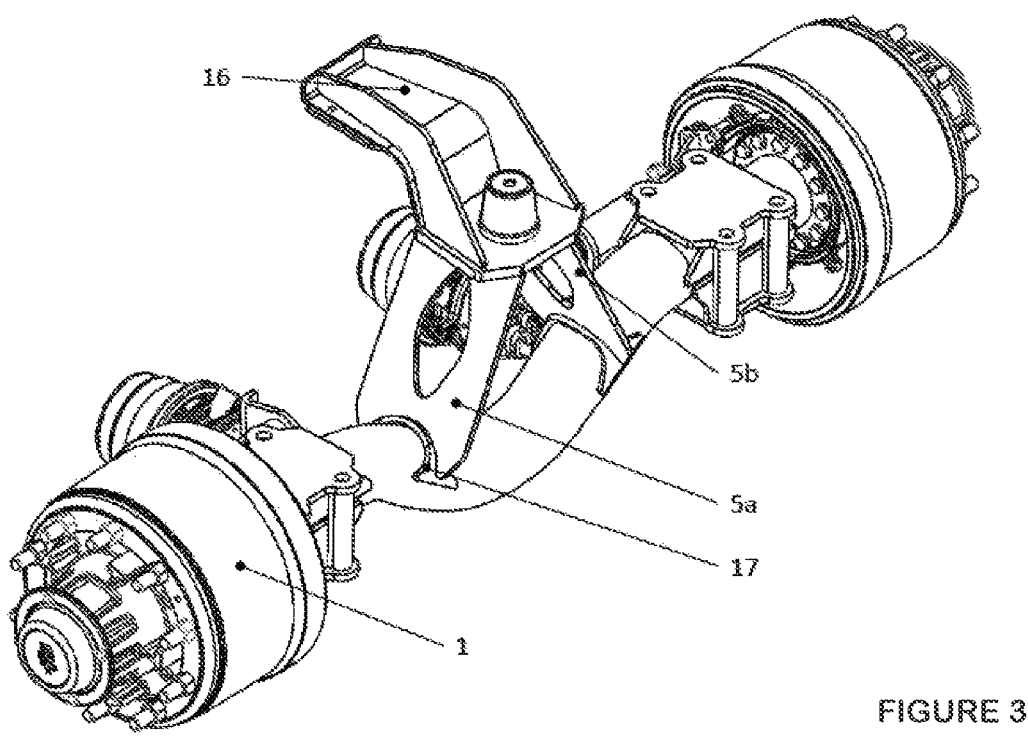
FIG. 3 shows a view of the drop-type auxiliary axle shown in FIG. 2, without the axle lift spring, without the anchor bars and without the axle lift spring secondary support, allowing a better view of the integrated support according to the present invention.

The preferred support device configuration in the present invention may be seen more clearly in FIGS. 2 and 3.

In FIG. 2, where several suspension and chassis components were removed 13 support 16 may be seen more clearly with respect to the present invention.

Better viewed in FIG. 3, the support device includes an integrated support 16 which has an insert 17 for the drop axle 1, whose purpose is to shift on the axle the pressure derived from the lift spring 4 and the anchor bars 3.

In the execution of the present inventions the two thin plates, in an inverse "V" configuration, 5a and 5b, are an innovative approach.

Figure 4:
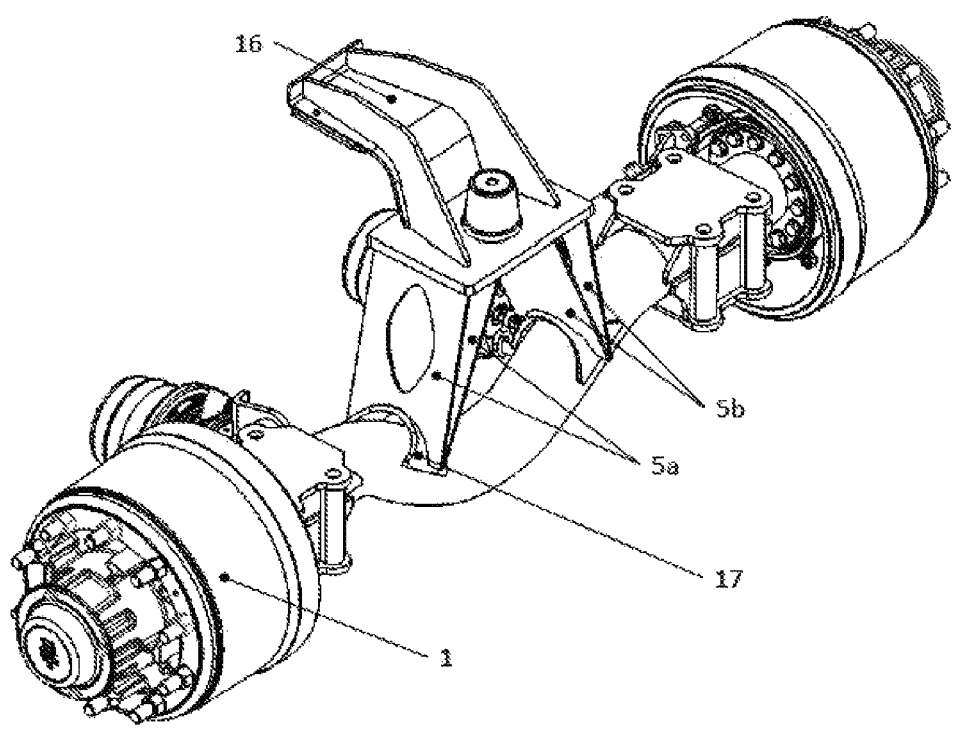
FIG. 4 shows a view of the drop-type auxiliary axle shown in FIG. 2, without the axle lift spring, without anchor bars and without the axle lift spring secondary support, showing an alternative construction solution with only one thin plate in each "V" side being used, following the same principle that governs the innovative concept of the present invention.

These thin plates 5a and 5b may have different construction configurations which do not change the character of the present invention, that is, their construction may utilize one or more thin plates 5a and 5b on each side of the "V", as is clearly seen in FIG. 3, or may have a simple plate on each side, as FIG. 4 shows, as well as variation in the angle between them.

The insert parts 17 (better seen in FIG. 3) are preferentially formed by curved plates and allow better distribution of pressure on drop axle 1, which allows for the welding on support 16 to be applied longitudinally and located close to its center and, therefore, near its neutral line where the pressure is at the lowest level.

The parts that include support 16 may have their geometry changed according to the type of bar 3 used or the lift spring model 4, but with no change to the character of the present invention.

The solution afforded by support 16, with the attachment plates in "V" 5*a* and 5*b* may be used only to attach anchor bar 3, in case the auxiliary axle does not possess the lift system or that system is not integrated in the support.

As illustrated in FIG. 1, in their preferred configuration, the support device in the present invention also includes a secondary support 6 which connects the lower end of the axle lift spring 4 to a portion of the chassis 13 of the vehicle.

Support 16 and the parts that are part of it including the plates 5*a* and 5*b* may be manufactured of any material and by any adequate process, including but not limited to steel plate profiling or welded metal construction.

In conclusion, it must be understood that the figures show implementations which illustrate the present invention's support device and auxiliary drop axle set-up while the true scope of the object of the invention is defined in the attached petition claims.

The invention claimed is:

1. A vehicle suspension, comprising:
   at least one anchor bar;
   at least one axle lift spring;
   an auxiliary drop axle configured to be selectively lifted and lowered, wherein the auxiliary drop axle includes a relief along a length of the auxiliary drop axle;
   wherein the auxiliary drop axle incudes a center portion and a pair of end portions each located at a higher vertical height than the center portion, and
   wherein the relief is located above the center portion; and
   a single, integrated support attaching the at least one axle lift spring and the at least one anchor bar to the auxiliary drop axle, wherein the single, integrated support provides the only attachment of the at least one axle lift spring and the at least one anchor bar to the auxiliary drop axle, wherein the support includes an open area configured to allow the passage of a cardan, and wherein the cardan extends through the relief in the auxiliary drop axle; and
   wherein the support includes a pair of support plates connected to the auxiliary drop axle, and wherein the pair of plates comprise a first pair of plates, and wherein a second pair of plates are positioned outboard of the first pair of plates and are connected to the auxiliary drop axle.

2. The vehicle suspension in accordance with claim 1, wherein the first pair of plates are configured in an inverted V-shaped format defining the open area configured to permit the passage of the cardan.

3. The vehicle suspension in accordance with claim 2, wherein the at least one anchor bar includes a first end attached to the support and a second end configured to attach to a vehicle chassis.

4. The vehicle suspension in accordance with claim 3, further comprising:
   a secondary support member supporting the at least one axle lift spring and configured to attach to a vehicle chassis.

5. The vehicle suspension in accordance with claim 1, wherein the at least one anchor bar includes a first end attached to the support and a second end configured to attach to a vehicle chassis.

6. The vehicle suspension in accordance with claim 1, further comprising:
   a secondary support member supporting the at least one axle lift spring and configured to attach to a vehicle chassis.

7. The vehicle suspension in accordance with claim 1, wherein the auxiliary drop axle is curved.

\* \* \* \* \*